UNITED STATES PATENT OFFICE.

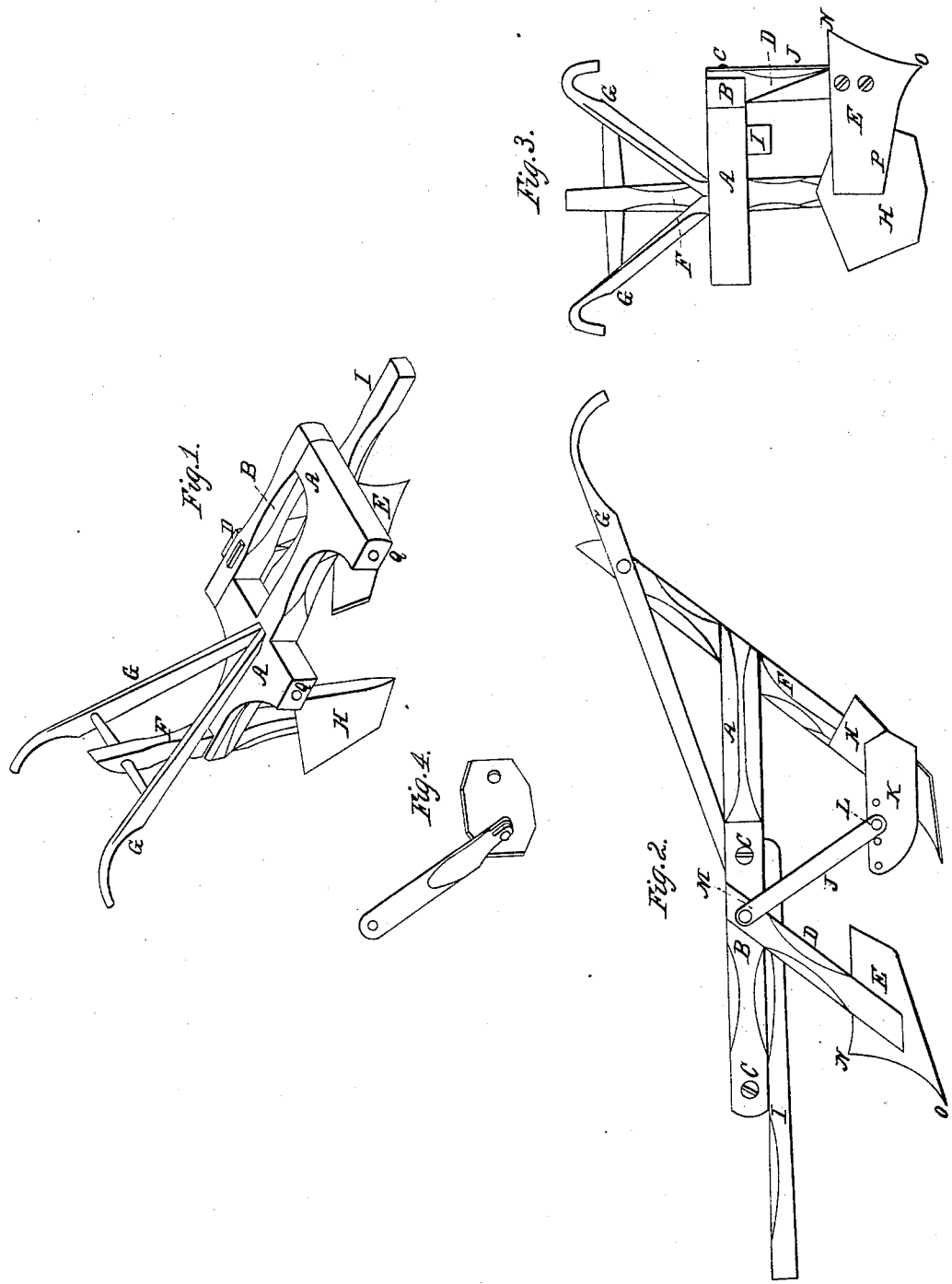

A. W. HAWLEY, OF MILAN, OHIO.

IMPROVEMENT IN CULTIVATORS.

Specification forming part of Letters Patent No. 18,900, dated December 22, 1857.

*To all whom it may concern:*

Be it known that I, A. W. HAWLEY, of Milan, in the county of Erie and State of Ohio, have invented certain new and useful Improvements in Cultivators; and I do hereby declare that the following is a full and exact description thereof, reference being made to the accompanying drawings, in which—

Figure 1 is a perspective view of my improved cultivator; Fig. 2, a side elevation, and Fig. 3 a front end view.

Like letters denote like parts in the different views.

A represents the body or frame, which is made of plank two inches thick, twelve inches wide, and two and a half feet long, in the form represented. The brace B is attached to the side of the frame A by means of screw-bolts C C, Figs. 2 and 3. These screw-bolts pass through the brace and screw into the body A. The brace B, which is movable, is about twenty-two inches long and of the same thickness as the body A. To this brace is framed the arm D in an angular position, as seen in Fig. 2, to which arm is secured the peculiarly-formed share E.

In the center of the rear end of the frame is attached the arm F, which has the same relative angle to the body as the arm D. To the upper end of this arm are connected the handles G by a round which extends from the arm F to the handles. The lower end of the arms are fastened to the frame A. The shovel-plow H is secured to the lower end of the arm F; and equidistant between the arm D and the arm F is bolted the draft-beam I on the under side of the frame, thereby constituting a center-draft cultivator, which may be of any desirable size and length, as the nature of the case may require.

To the side of the arm or brace is connected the adjustable arm J, to which is attached the fender K by a pin-joint at L, Fig. 2. The arm J moves, and may be set in any proper position by the screw M, by which it is connected to the brace.

In the fender are a series of holes, so that it may be adjusted from one position to another, as may be found expedient.

Having described the peculiar construction and arrangement of my cultivator, I will proceed to describe the principle of its operation.

The fender K trails behind the share opposite to the shovel plow and to the left of it. It is so hung as to run near the rows of grain or other plants and receive the force of the earth from the shovel-plow, which causes the earth to fall gently on the rows, and also prevents an excess of earth from covering up or breaking down the young plant, as in ordinary cases. The fender may be so set by tightening the screw M that only the back portion will trail upon the ground, in which position a part of the earth only passes to the row by the action of the shovel-plow, while the clods, lumps, stones, &c., are reflected by the fender. Thus by means of the screw M, pin L, and holes the quantity of earth thrown upon the rows may be gaged. The utility of the fender is apparent. It is particularly essential in the first cultivation of the crop or when the plant is young and tender.

Figs. 1 and 2 show the cultivator as arranged for the first working of the earth, the fender being on the left side of the frame, also the brace B, arm D, and share E, the fender being next to the row in the rear of the share, and opposite the shovel-plow, as set forth. As thus arranged the implement is required to pass twice between each two rows to perfect the work. The share E will then carry all that it cuts to the right mold board of the shovel-plow, which buries all the weeds which have been rooted or cut out by the share into the center of the row. This leaves the soil loose and free from weeds, in which state it is conveyed to the rows by the left side of the shovel-plow, the fender being in place, as before set forth.

In Fig. 3 it will be observed that the upper part, N, of the share E extends to the left of the point O, giving the edge extending from O to N an inclination from the rows of several inches. In a practical machine this allows the upper edge to come close to the plants without the points O disturbing the roots of them. The share is also distinguished from others in having a straight line from near the point to its left side, which prevents clogging, causing loose substances to be cut up or raised to the surface. The point O in ordinary use cuts some three inches in depth, while the right or rear part, P, merely cuts the surface, which leaves an inclined bed of loose earth free from weeds to be thrown by the left side of the shovel-plow to the rows, as before described.

It will be noticed that the share leaves the soil inclined to the row, which causes the greater portion of the earth to be brought in such position as to be taken up and carried toward the row by the left side of the shovel-plow. The earth is also more effectually loosened up by this means.

The brace B, with the arm D, is detached from the left side, as seen in the drawings, and bolted to the right side.

Q Q, Fig. 7, represents the screw-holes for the bolts. It is arranged in this manner for the second culture, and worked with the right side of the machine to the row, it requiring to be passed each side of a row to complete the work. A ridge is formed between the rows in the first culture, which ridge in the second working is thrown by successive furrows to the rows, leaving a broad and continuous ridge of loose earth for the absorption and retention of moisture for the plants. In the first culture, while the roots of the plants are not extended, the earth near the rows is worked deep; but in the second culture the earth is merely broken up upon the surface near the row by the action of the share, which extends deeper as it recedes to the center of the rows.

Fig. 4 represents a fender being connected to the arm J by a double joint. The upper or large portion is to be bolted firmly to the arm D, and may be set to the gage required. The joint then allows the fender to swing to the shovel-plow, or up or down, but not from it, only in a straight line.

What I claim as my improvement, and desire to secure by Letters Patent, is—

The movable fender K, adjustable arm J, and movable brace B, with the peculiar-shaped share E, when arranged as set forth, and for the purpose of protecting the plant from injury, as specified, and for changing the share and fender to the right or left of the frame, in the manner and for the purpose specified.

A. W. HAWLEY.

Witnesses:
  A. J. MOURY,
  SETH JENNINGS.